United States Patent [19]

Onodera

[11] 4,437,165

[45] Mar. 13, 1984

[54] OVERFLOW DETECTION FOR A DECIMAL ARITHMETIC UNIT

[75] Inventor: Osamu Onodera, Hadano, Japan

[73] Assignee: Hitachi, Ltd., Tokyo, Japan

[21] Appl. No.: 282,167

[22] Filed: Jul. 10, 1981

[30] Foreign Application Priority Data

Jul. 11, 1980 [JP] Japan .................................. 55-93950

[51] Int. Cl.³ ................................................ G06F 7/48
[52] U.S. Cl. ................................................ 364/749
[58] Field of Search ............................... 364/749, 900

[56] References Cited

U.S. PATENT DOCUMENTS

| | | | |
|---|---|---|---|
| 4,021,655 | 5/1977 | Healey et al. ........................ | 364/749 |
| 4,161,784 | 7/1979 | Cushing et al. ................. | 364/749 X |
| 4,224,676 | 9/1980 | Appelt ............................. | 364/900 X |
| 4,301,514 | 11/1981 | Eifuku et al. ........................ | 364/900 |

OTHER PUBLICATIONS

Rosenfeld, "Variable-Width Adder for Microprogrammed Computers Used for Emulation", *IBM Technical Disclosure Bulletin*, vol. 15, No. 4, Sep. 1972, pp. 1149-1150.

*Primary Examiner*—David H. Malzahn
*Attorney, Agent, or Firm*—Antonelli, Terry & Wands

[57] ABSTRACT

A data processing apparatus for performing decimal arithmetic operation with the aid of a decimal arithmetic unit having an operation width corresponding to a plurality of bytes. Length value of an operand which is to undergo arithmetic operation of the decimal arithmetic unit is held in an operand length register, while a byte position which constitutes the least significant position in the arithmetic operation is held in an operand point register. An overflow detection controlling circuit generates a control signal in accordance with the contents in both the registers. An overflow detecting circuit detects presence or absence of an overflow by checking a particular byte contained in the output of the decimal arithmetic unit, the particular byte being designated by the control signal produced from the overflow detection controlling circuit.

5 Claims, 1 Drawing Figure

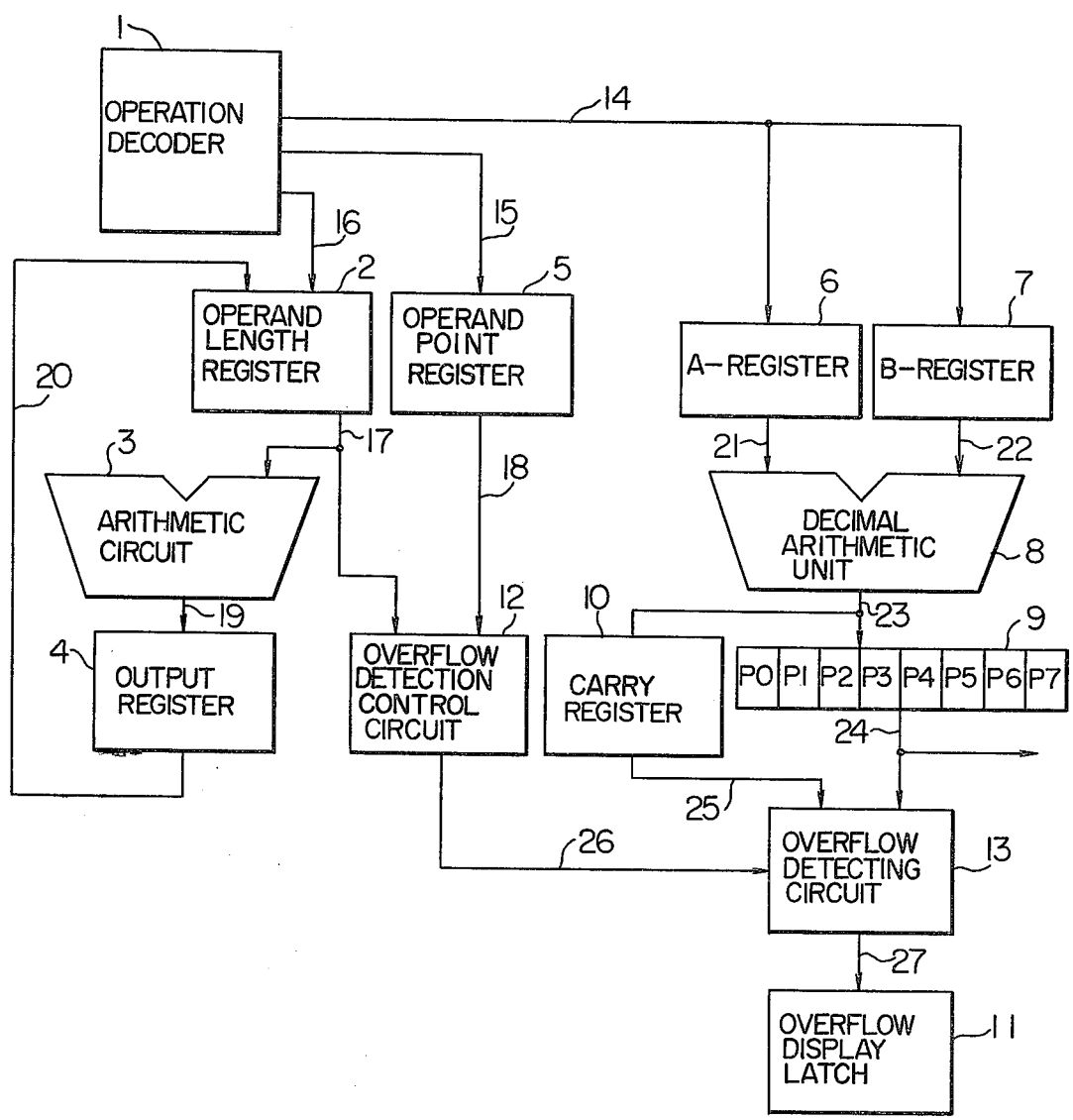

OVERFLOW DETECTION FOR A DECIMAL ARITHMETIC UNIT

BACKGROUND OF THE INVENTION

The present invention relates in general to a data processing apparatus incorporating a decimal arithmetic function. In particular, the invention concerns detection of overflow in the data processing apparatus which is adapted for performing decimal arithmetic operations with the aid of a decimal arithmetic unit having an operation width corresponding to a plurality of bytes.

Heretofore, arithmetic units operative on the byte base have been extensively employed as a means for implementing decimal arithmetic functions. In this connection, detection of overflow is effected serially for every byte, involving substantially no technical problems.

However, recently with the advent and development of the decimal arithmetic unit having an operation width (or capacity) corresponding to a plurality of bytes, the presence or absence of an overflow in the result of the decimal arithmetic operation is detected in succession to the execution of the arithmetic operation cycle by verifying whether a binary "1" is set or not at a more significant position than that of the byte which has undergone the decimal arithmetic operation. To this end, there is employed a shifter or the like. This system requires, however, an additional cycle for detecting the overflow after the arithmetic operation cycle. This means that the speed of the decimal arithmetic operation is correspondingly lowered, providing a problem to be solved for enhancing the performance of data processing apparatus incorporating the decimal arithmetic unit of the plural byte capacity.

SUMMARY OF THE INVENTION

Accordingly, an object of the invention is to provide a data processing apparatus of an improved structure in which the detection of overflow can be effected simultaneously with the arithmetic operation of the demical arithmetic unit having an operation width corresponding to plural bytes, whereby the operation speed of the data processing apparatus is remarkably increased.

According to a basic concept of the present invention, it is proposed that the length of an operand which is subjected to arithmetic operation of a decimal arithmetic unit is held in an operand length register, while the byte position which constitutes the least significant position or digit in the arithmetic operation is held in an operand point register. A control signal is produced in accordance with the contents placed in both the registers. The value of a particulate byte of the output from the decimal arithmetic unit which byte is designated by the control signal is checked by an overflow detecting circuit for detecting the presence of absence of the overflow.

BRIEF DESCRIPTION OF THE DRAWINGS

The FIGURE shows in a block diagram a general arrangement of an arithmetic processing unit according to an exemplary embodiment of the invention.

DETAILED DESCRIPTION OF THE PREFERRED EMBODIMENT

Referring to the accompanying drawing which shows an arithmetic processing unit according to an embodiment of the invention, an operation decoder 1 is connected to an A-register 6, B-register 7, an operand point register 5 and an operand length register 2 through signal lines 14, 15 and 16, respectively. An overflow detection control circuit 12 is connected to the operand length register 2, the operand point register 5 and an overflow detecting circuit 13 through signal lines 17, 18 and 26, respectively.

An arithmetic circuit 3 is connected to the operand length register 2 and an output register 4 through the signal line 17 and a signal line 19, respectively. The output register 4 in turn is connected to the operand length register 2 through a signal line 20. The A-register 6 is connected to the operation decoder 1 and a decimal arithmetic unit 8 through the signal line 14 and a signal line 21, respectively, while the B-register 7 is connected to the operation decoder 1 and the decimal arithmetic unit 8 through the signal line 14 and a signal line 22, respectively.

The decimal arithmetic unit 8 is connected to the A-register 6 and the B-register 7 through the signal lines 21 and 22, respectively, and additionally to carry register 10 and an output register 9 through a signal line 23. The carry register 10 is connected to the decimal arithmetic unit 8 and the overflow detecting circuit 13 through the signal line 23 and a signal line 25, respectively, while the output register 9 is connected to the decimal arithmetic unit 8 and the overflow detecting circuit 13 through the signal line 23 and a signal line 24, respectively.

The overflow detecting circuit 13 is connected to the output register 9 and the carry register 10 through the signal line 24 and a signal line 25, respectively, and further connected to the overflow detection control circuit 12 and an overflow display latch 11 through signal lines 26 and 27, respectively.

In the case of the illustrated embodiment, it is assumed that the decimal arithmetic unit 8 holds 8-bytes and that the A-register 6 and the B-register 7 as well as the output register 9 also each hold 8-bytes.

With the circuit arrangement described above, decimal arithmetic operations are performed in the manner described below.

Operands are fed from the operation decoder 1 through the signal line 14, whereby a first operand is placed in the B-register 7 and a second operand is set in the A-register 6. The length of the operand to be arithmetically processed is loaded in the operand length register 2 from the operation decoder 1 through the signal line 16. Further, a value indicating a location of the least significant digit of the operand of the 8-byte width is loaded in the operand point register 5 by way of the signal line 15. The first and the second operands placed in the B-register 7 and the A-register 6 are then inputted to the decimal arithmetic unit 8 through the respective signal lines 22 and 21, whereby the decimal arithmetic operation is effected, the result of which is set to the output register 9 and the carry register 10 through the signal line 23.

The operand length stored in the operand length register 2 is decreased by the number of digits which has undergone arithmetic operation of the decimal arithmetic unit 8, while the remainder operand length is to be displayed. To this end, the remainder operand length is fed to the arithmetic circuit 3 through the signal line 17 to undergo the subtracting operation, the result of which is once set at the output register 4 through the signal line 19 and returned to the operand length register 2 through the signal line 20 upon every completion of the arithmetic operation cycle for preparation for the next decimal arithmetic operation.

The decimal arithmetic operation may be completed through a single operation cycle or may be carried out over several cycles in dependence on the operands. More particularly, the decimal arithmetic operation is repeatedly performed by means of the decimal arithmetic unit 8 until the contents of the operand length register 2 is less than zero. The operands are fed to the B-register 7 and the A-register 6 from the operation decoder 1 for every arithmetic operation, the result of which is take out through the signal line 23.

Next, description will be made on the operation for detecting the overflow. It should be understood that the output register 9 is divided into eight stages P0, P1, ..., P7 each of one byte so that the result of operation of eight bytes in total can be stored in the output register 9, with the carry from the most significant byte or stage P0 being adapted for storage in the carry register 10.

In the first place, description will be made on the assumption that the arithmetic operation is completed during the first operation cycle, i.e. for the assumed case in which the contents in the operand length register 2 is equal to the one stored in the operand point register 5 or smaller than the latter. In this case, the overflow detection control circuit 12 issues to the overflow detecting circuit 13 a command to the effect that an overflow should be detected in the first arithmetic operation cycle and additionally designates a specific byte P0, ..., or P7 of the output from the output register 9 or the output carry register 10 which byte is to be checked for the detection of overflow.

For example, when the contents (hereinafter denoted by L) of the operand length register 2 is "2" while the contents (hereinafter denoted by P) of the operand point register 5 is "3", the bytes P1, P2 and P3 of the output register 9 are subjected to the arithmetic peration. Thus, the overflow detection control circuit 12 issues to the overflow detector circuit 13 a command to check whether "1" is set or not at the byte position P0. When "1" is set at the byte position P0, then the overflow display latch circuit 11 is set by the overflow detecting circuit 13. In general, the position or location (i=0, ... or 7) of the byte (Pi) for which the presence or absence of the overflow is to be checked can be determind in accordance with a formula: $i=P-(L+1)$.

For example, in the case where $P=L=1$, then $i=-1$, resulting in that the overflow detecting circuit 13 is commanded to check the value in the carry register 10. When "1" is set in the carry register 10, then the overflow display latch circuit 11 is set.

The overflow detecting operation described above is automatically carried out in succession to the operation of the decimal arithmetic unit 8 during one and the same operation cycle.

Next, description will be made of an example of the decimal arithmetic operation which requires two or more operation cycles, i.e. for the case where $P<L$.

For example, it is assumed that L=15 and P=5. In the first operation cycle, the overflow detection control circuit 12 suppresses or prohibits the overflow detection operation of the overflow detecting circuit 13, because $P<L$. The bytes to be processed in this arithmetic operation cycle are P0 to P5. Further, arithmetic operation in accordance with $L=L-(P+1)$ is effected by the arithmetic circuit 3 during this first operation cycle, the result of which is loaded in the output register 4.

In precedence to the initiation of the second arithmetic operation cycle, the contents in the output register 4 is transferred to the operand length register 2. Accordingly, L=9 applies to the second operation cycle. For the operation cycles succeeding the first cycle, the overflow detection control circuit 12 take automatically values P as is being equal to 7. Of course, contents of the operand point register 5 are updated through the arithmetic operation in the manner similar to the operand length register 2. However, since P takes a fixed value of "7" for the operation cycles the first cycle in contrast to the contents L, the result equivalent to that attained by updating the contents P can be obtained by virtue of such arrangement that the overflow detection control circuit 12 values P=7, as described above.

Since $P<L$ in the second operation cycle, no detection of overflow is effected. In this cycle, the bytes to be arithmetically processed are P0, ... P7.

In precedence to the third operation cycle, the contents L of the operand length register 2 is updated to 1 ($=9-8$). Since $P \geq L$ is valid, the overflow detection control circuit 12 issues to the overflow detecting circuit 13 a command to the effect that the overflow detecting operation be carried out in this operation cycle and at the same time designates the location or position of byte to be checked in accordance with a formula: $i=P-(L+1)$. Since i is assumed to be equal to 5 in this case, the byte P5 of the output register 9 is checked. When "1" is set at the byte P5, the overflow detecting circuit 13 sets the overflow display latch 11. In this third operation cycle, the bytes P6 and P7 are to be arithmetically processed.

In general, in the case of the decimal arithmetic operation requiring two or more operation cycles, the contents P of the operand point register 5 can be fixedly set equal to $N-1$ for the operation cycles which follow the second operation cycle, assuming that the width of the decimal arithmetic unit 8 is of N bytes.

As will be apparent from the foregoing description, the invention has now provided an improved data processing apparatus incorporating a decimal arithmetic unit which allows an overflow occurring in the decimal operation of the decimal arithmetic unit of a plural byte capacity to be detected simultaneously in the operation cycles, and thus assures execution of the decimal arithmetic operations at a high speed.

I claim:

1. A data processing apparatus in which a decimal operation is effected by means of a decimal arithmetic unit having an operation width corresponding to a plurality of bytes, comprising:
    (a) a first register for holding information on the length of an operand which is subjected to an arithmetic operation in said decimal arithmetic unit;
    (b) a second register for holding a byte position which constitutes the least significant byte position for the arithmetic operation;
    (c) control signal generating means coupled to said first and second registers for producing a control signal in accordance with contents of said first and second registers; and
    (d) overflow detecting means coupled to said decimal arithmetic unit and said control signal generating means for detecting presence of absence of an overflow by checking a value of a particular byte of the output of said decimal arithmetic unit which byte is designated by said control signal.

2. A data processing apparatus according to claim 1, further comprising means for updating the contents of said first and second registers for every arithmetic operation cycle, said arithmetic operation cycle being defined as a single operation effected by means of said decimal arithmetic unit.

3. A data processing apparatus according to claim 2, wherein said second register holds the least significant byte position in said operation width of arithmetic operation cycles succeeding a first arithmetic operation cycle.

4. A data processing apparatus according to claim 3, wherein said control signal generating means is adapted to suppress the overflow detection by said overflow detecting means, when the content of said first register is greater than that of said second register.

5. A data processing apparatus according to claim 1, wherein said first register holds the length of an operand minus one.

* * * * *